United States Patent [19]

Tsuchiya

[11] 4,454,599
[45] Jun. 12, 1984

[54] APPARATUS FOR REPRODUCING SIGNALS FROM A DISC

[75] Inventor: Yuzo Tsuchiya, Fukaya, Japan

[73] Assignee: Tokyo Shibaura Denki Kabushiki Kaisha, Kawasaki, Japan

[21] Appl. No.: 306,347

[22] Filed: Sep. 28, 1981

[30] Foreign Application Priority Data

Oct. 3, 1980 [JP] Japan ............................... 55-137573
Jan. 30, 1981 [JP] Japan ............................ 56-11055[U]
May 9, 1981 [JP] Japan ................................ 56-69828

[51] Int. Cl.³ ............................................. G11B 17/04
[52] U.S. Cl. .................................... 369/77.2; 360/133
[58] Field of Search ................... 369/77, 79, 258, 262, 369/263, 264, 270; 360/86, 99, 133

[56] References Cited

U.S. PATENT DOCUMENTS

| | | | |
|---|---|---|---|
| 3,940,148 | 2/1976 | Tarrington et al. | 369/79 |
| 4,063,286 | 12/1977 | Takahara et al. | 369/79 |
| 4,098,511 | 7/1978 | Leedom | 369/79 |
| 4,326,284 | 4/1982 | Elliott | 369/77.2 |
| 4,408,321 | 10/1983 | Yamamura | 369/77.2 |

FOREIGN PATENT DOCUMENTS 2087128  5/1982  United Kingdom ............... 369/77.2

Primary Examiner—Steven L. Stephan
Attorney, Agent, or Firm—Cushman, Darby & Cushman

[57] ABSTRACT

A disc stored in a casing is inserted in an apparatus for reproducing signals from the disc. The apparatus comprises: a housing having at one side an inlet through which the casing is inserted, a cover movable between a close position where it closes the inlet of the housing and an opening position where it opens the inlet, and a locking mechanism for preventing the cover from moving to the opening position when signals are reproduced from the disc and for moving the cover to the opening position when signals are not reproduced from the disc.

20 Claims, 30 Drawing Figures

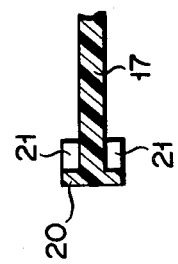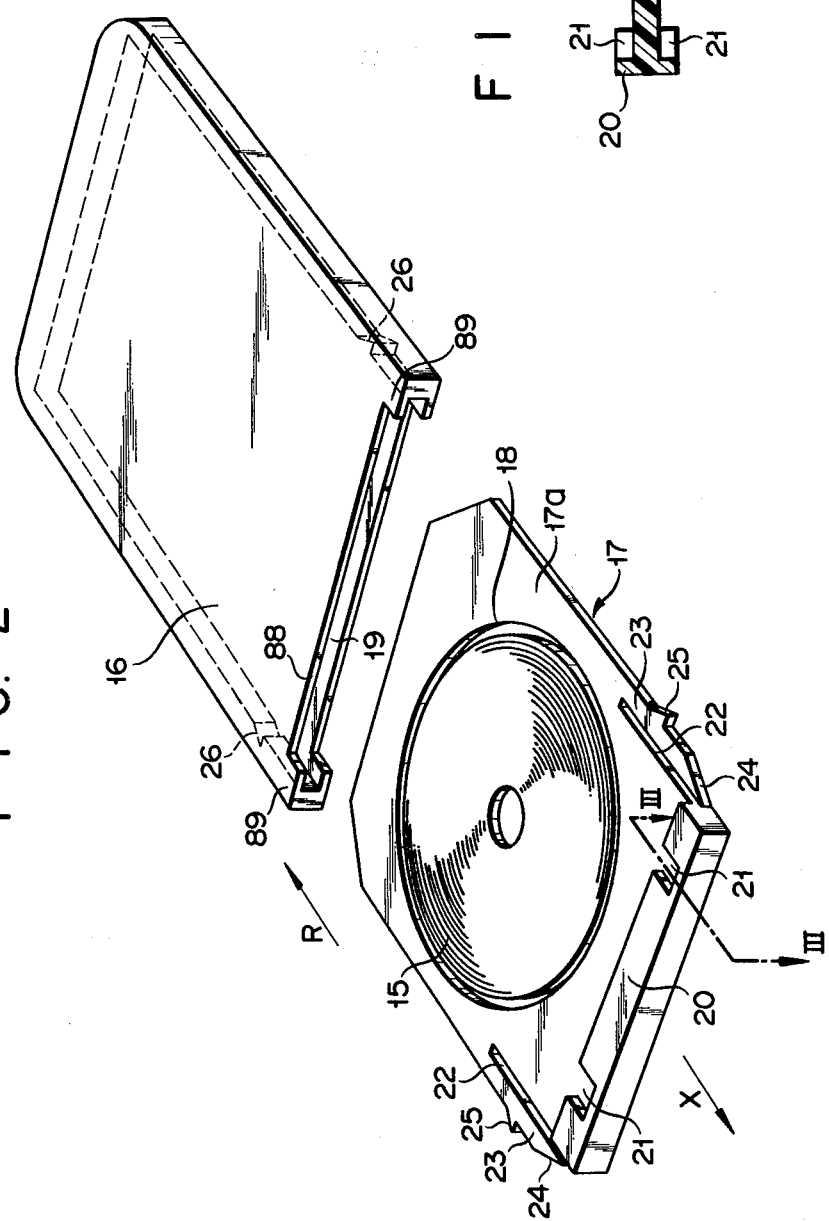

F I G. 10
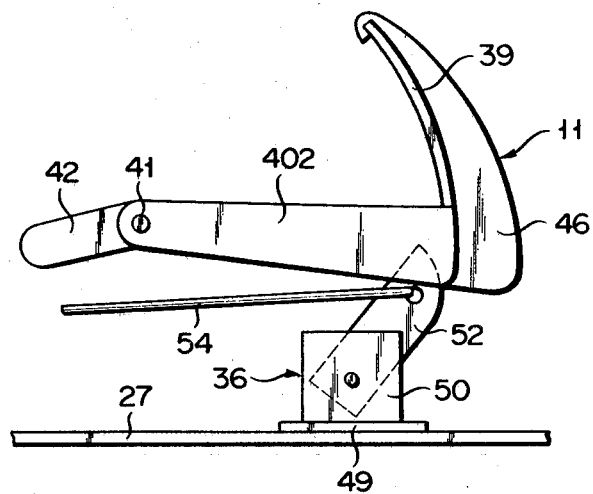
F I G. 13
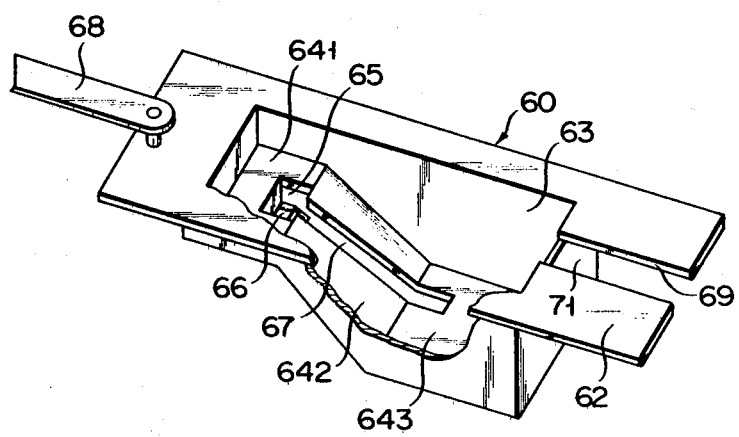

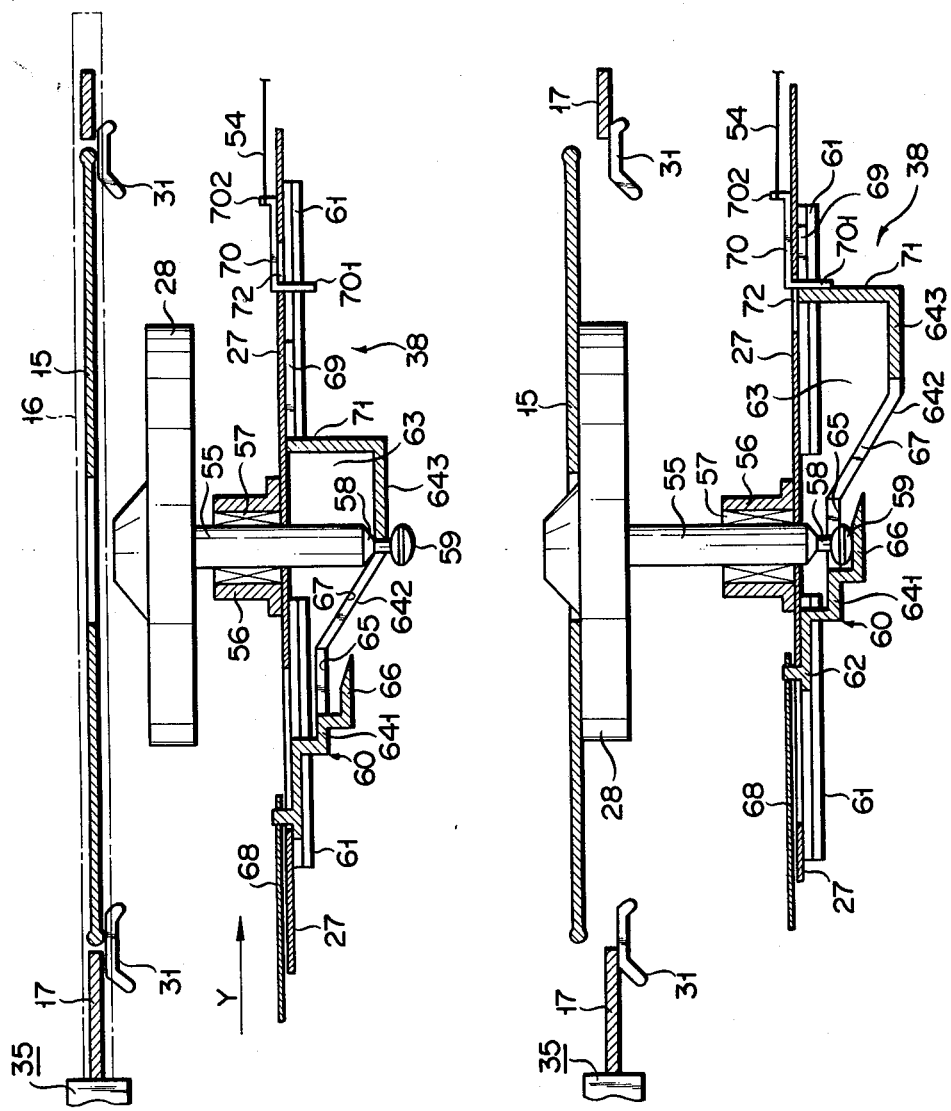

F I G. 14
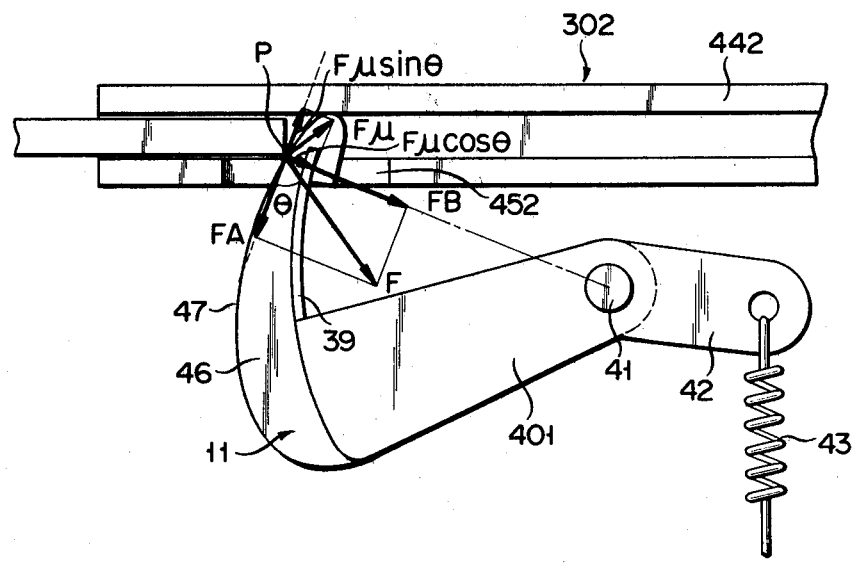
F I G. 15
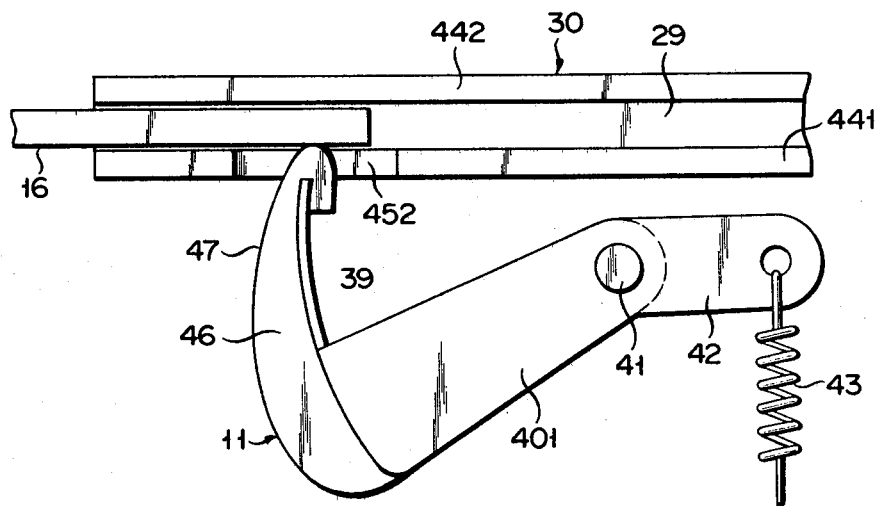

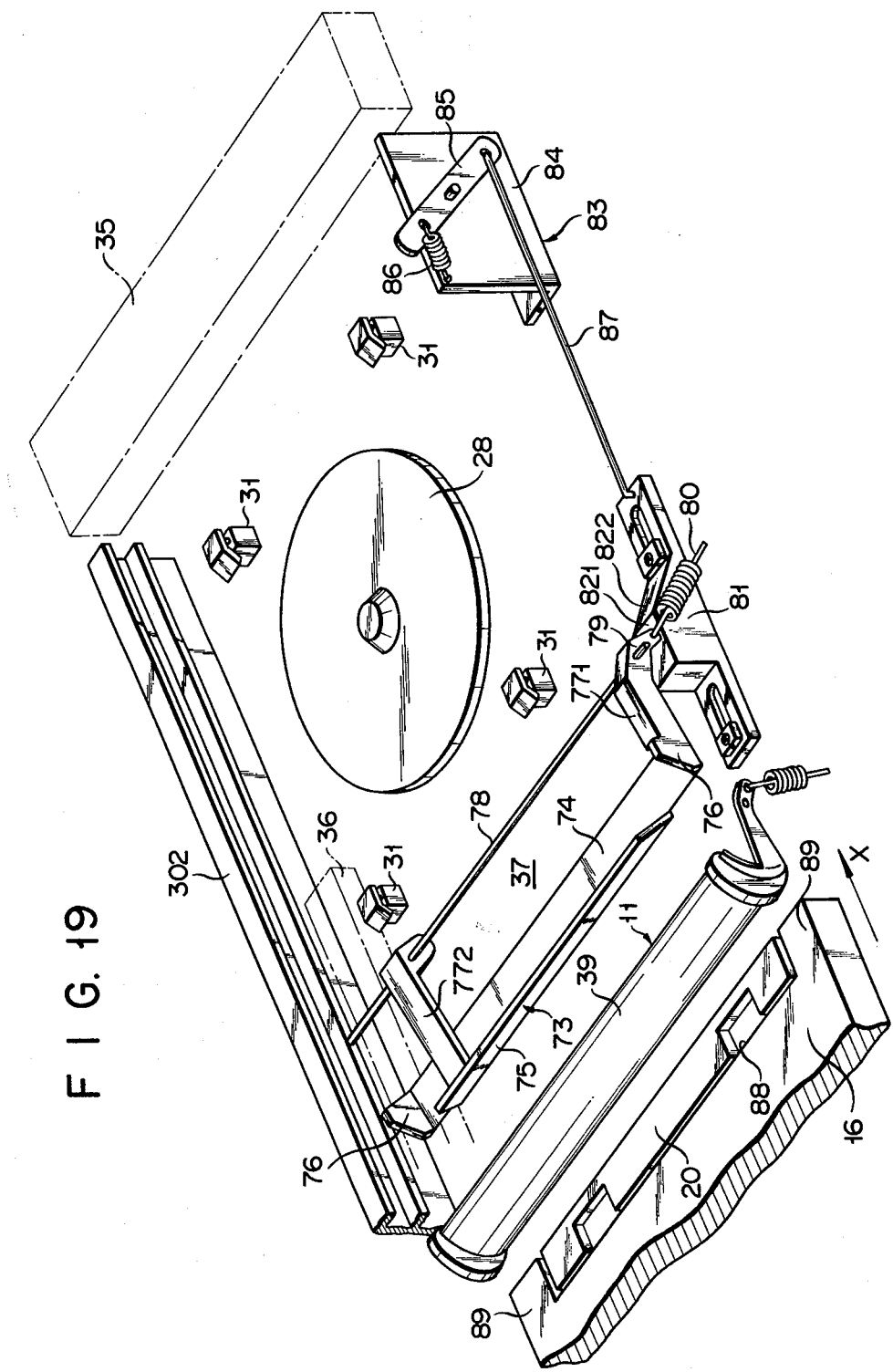

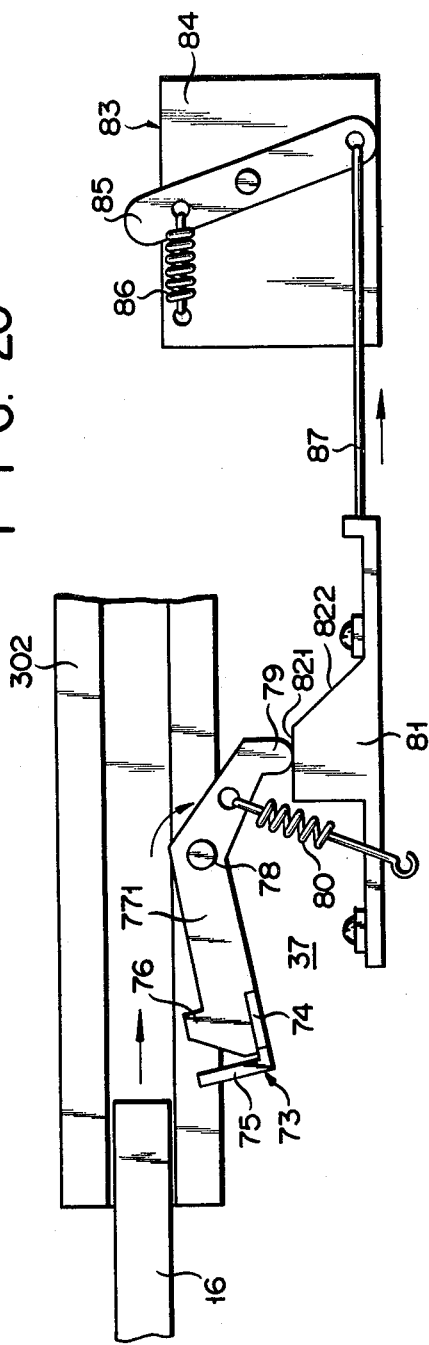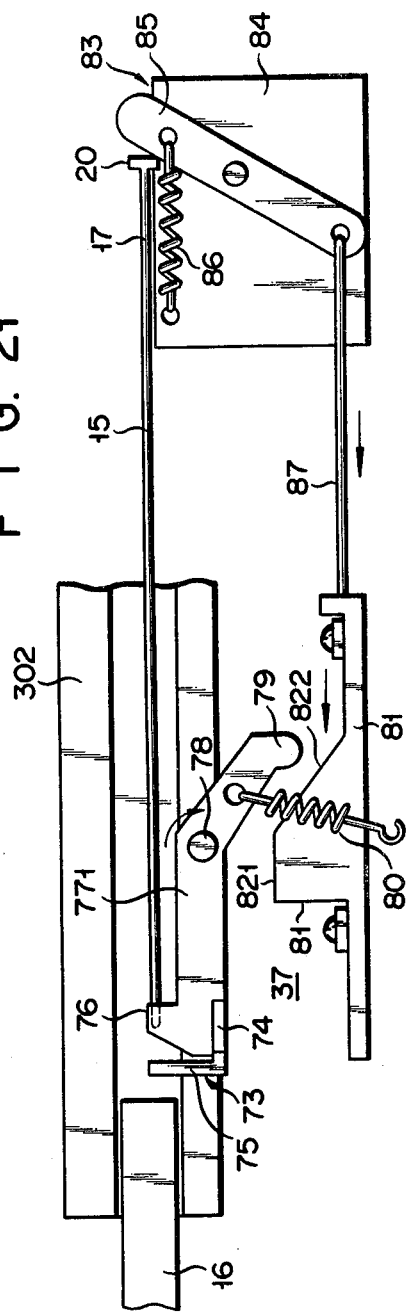

F I G. 26
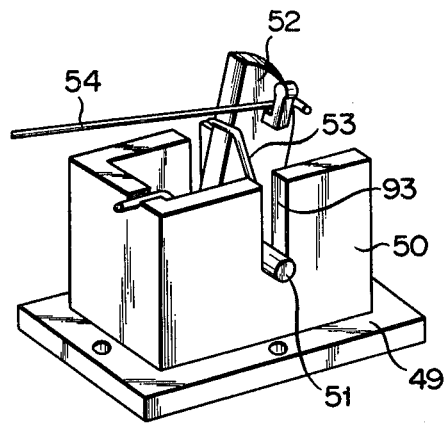
F I G. 27
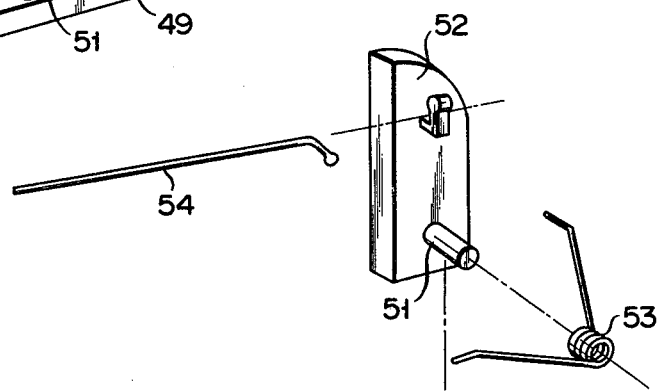
F I G. 28
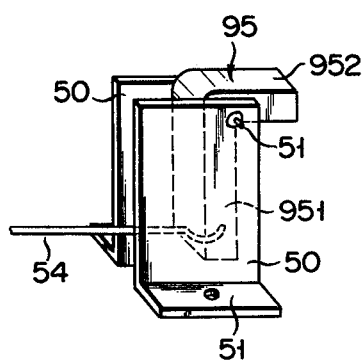
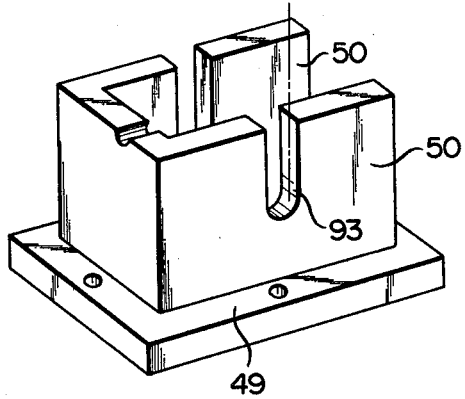

APPARATUS FOR REPRODUCING SIGNALS FROM A DISC

BACKGROUND OF THE INVENTION

The present invention relates to an apparatus for reproducing signals, for example video and/or audio signals, from a disc, and more particularly, to an apparatus for reproducing signals from a disc in which a cover is arranged at an insertion inlet through which a casing for holding a disc is inserted.

In general, for example, a video disc is mounted on a turntable of an apparatus for reproducing PCM signals by a reproducing stylus coming in contact with the video disc to reproduce PCM signals recorded on the video disc. These signals consist of a video signal and an audio signal and are recorded at an extremely high packing density in accordance with the PCM (pulse code modulation) recording system, etc. When the surface of the video disc is contaminated by dust and fingerprints, reproduction is degraded and noise is mixed with the reproduced signals. Various apparatuses have been developed comprising a means for mounting and dismounting a video disc on the turntable without it being touched by the hand.

The outer periphery of the video disc is surrounded by a holding frame which is locked in a casing with one side remaining open; thus, the video disc is stored in the casing. The video disc in this condition is inserted in the apparatus for reproducing PCM signals from one side through an insertion inlet which is provided with a cover. This cover is provided to protect the inside of the apparatus from dust.

During reproduction, when the empty casing is inserted in the apparatus through the insertion inlet, the video disc from which PCM signals are reproduced and internal mechanisms of the apparatus may be damaged.

SUMMARY OF THE INVENTION

The present invention has been accomplished in consideration of these circumstances and has for its object to provide an apparatus for reproducing signals from a disc, which prevents insertion of a casing as well as foreign materials during reproduction.

According to an aspect of the present invention, there is provided an apparatus for reproducing signals from a disc, in which the disc stored in a casing is inserted, and which comprises;

a housing having at one side an opening through which said casing is inserted; a cover movable between a first position where it closes the opening of said housing and a second position where it opens the opening; and a locking mechanism for preventing the cover from moving to the second position when signals are reproduced from the disc and for moving the cover to the second position when signals are not reproduced from the disc.

BRIEF DESCRIPTION OF THE DRAWINGS

FIG. 2 is a perspective view illustrating a video disc, a holding frame which holds the video disc, and a casing for storing the video disc, all of which are employed for the apparatus as shown in FIG. 1;

FIG. 3 is a sectional view taken along the line III—III of FIG. 2;

FIG. 10 is a side view of the locking mechanism in its locked condition;

FIG. 11 is a side sectional view of a driving mechanism for a turntable in its nonreproducing condition;

FIG. 12 is a side sectional view of the driving mechanism for the turntable in its reproducing condition;

FIG. 13 is a partially cutaway perspective view of a slider shown in FIGS. 11 and 12;

FIG. 14 is a side view of a cam member mounted to the cover;

FIG. 15 is a side view of the cam member, the operating condition of which is different from that shown in FIG. 14;

FIG. 19 is a perspective view of an auxiliary cover mechanism shown in FIG. 4;

FIG. 20 is a side view of the auxiliary cover mechanism, the position of which allows insertion of the casing;

FIG. 21 is a side view of the auxiliary cover mechanism, when the insertion inlet is closed;

FIG. 26 is a perspective view of one modification of the locking mechanism according to the one embodiment;

FIG. 27 is an exploded persective view of the locking mechanism shown in FIG. 26;

FIG. 28 is a perspective view of another modification of the locking mechanism according to the one embodiment;

DETAILED DESCRIPTION OF THE PREFERRED EMBODIMENT

One embodiment of an apparatus for reproducing signals from a disc according to the present invention will be described in detail with reference to the accompanying drawings.

Figure 1:
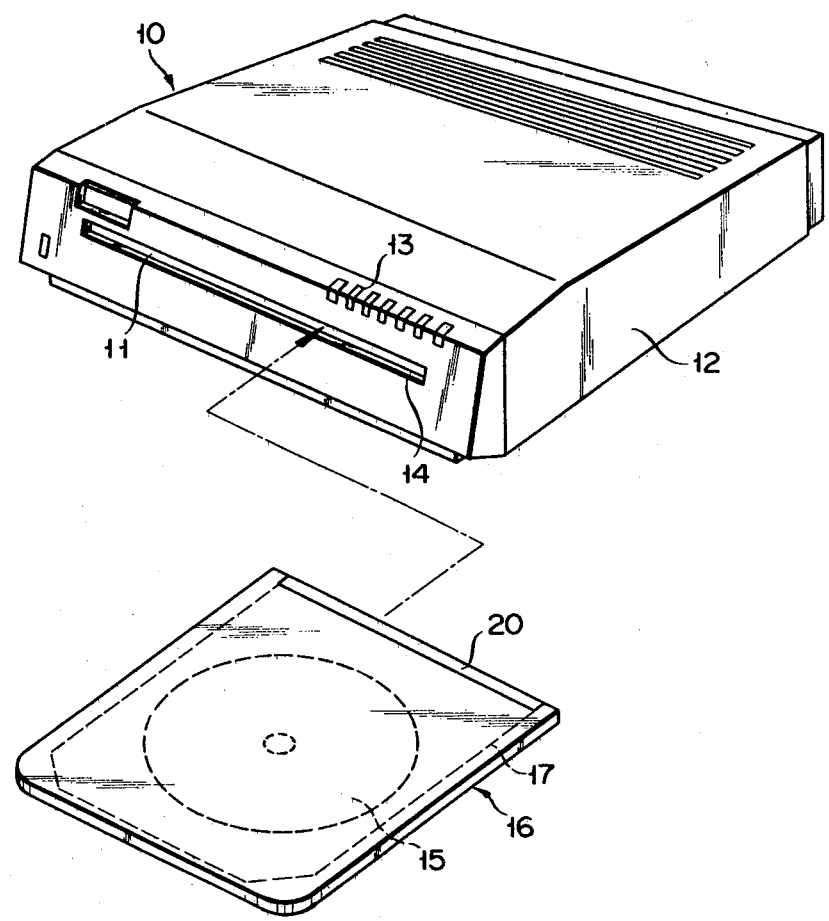
FIG. 1 is a perspective view illustrating one embodiment of an apparatus for reproducing signals from a disc according to the present invention.

Referring to FIG. 1, an apparatus 10 for reproducing signals from a disc is a video disc player in this embodiment. The video disc player 10 has a housing 12. A plurality of operation buttons 13 are arranged on the front upper surface of the housing 12 to instruct various operations. A horizontally extending insertion inlet 14 is formed for insertion of a casing 16 at the front side surface of the housing 12. A cover 11 is pivotally arranged so as to open or close at the insertion inlet 14. A locking mechanism 36 to be described later is arranged at the cover 11. The locking mechanism 36 locks the cover 11 when the player 10 is in its reproducing condition, while the locking mechanism 36 releases locking of the cover 11 when the player 10 is in its nonreproducing condition. A reproducing mechanism (not shown) for reproducing PCM signals on a video disc 15 is mounted in the housing 12.

When the player 10 is in nonreproducing condition, the video disc 15 is stored with a holding frame 17 in the casing 16. In this condition, the video disc 15 is not exposed, so that the video disc 15 does not come in direct contact with the fingers. The video disc 15 is thus not contaminated.

As shown in FIG. 2, the video disc 15 is arranged in a through hole 18 which is slightly larger than the video disc 15 and which is formed at the center of the holding frame 17. Therefore, the video disc 15 moves integrally with the holding frame 17 in accordance with the horizontal movement of the holding frame 17, while the video disc 15 is free to move vertically, independently of the holding frame 17. The casing 16 is formed as a thin box, one side of which has an opening 19 through which the video disc 15 with the holding frame 17 is inserted in the direction shown by an arrow R. A space is formed inside the casing 16 to store the video disc 15 with the holding frame 17.

The holding frame 17 has a main body 17a which is slightly thicker than the video disc 15 and is slightly thinner than the height of the opening 19 of the casing 16 and which has the through hole 18, and a bank 20 of substantially the same thickness as the casing 16, which is formed at one side along the direction perpendicular to the arrow R. Recesses 21 are formed at the upper surfaces of both ends of the bank 20. The bottom surfaces of the recesses 21 are even with the upper surface of the main body 17a. As shown in FIG. 3, the recesses 21 are also formed on the lower surfaces at both ends of the bank 20. Slits 22 are formed with a predetermined length in the direction of insertion shown by the arrow R at both sides of the main body 17a of the holding frame 17. A pair of elastic segments 23 extending along the direction of insertion shown by the arrow R are defined by the slits 22 at both sides of the main body 17a. A pawl 25 is formed in the middle of each elastic segment 23, protruding outwardly. Each pawl 25 has a locking surface perpendicular to the direction of insertion shown by the arrow R, and a pressing surface which is inclined, tapering along the direction of insertion. The outer surface of the top of each elastic segment 23 is an inclined surface 24 which tapers along the opposite direction to the direction of insertion shown by the arrow R.

Locking grooves 26 are formed on the inner surfaces which define the inner space of the casing 16 at the corresponding positions for receiving the respective pawls 25 of the holding frame 17 when the holding frame 17 is completely inserted in the casing 16. As the holding frame 17 surrounds the video disc 15, the side of the holding frame 17 at which the bank is not formed is oriented toward the opening 19, and the holding frame 17 is inserted in the casing 16 through the opening 19. While the pawls 25 become in contact with the edges of the opening 19 of the casing 16 during insertion, both elastic segments 23 are urged inwardly due to engagement with the pressing surfaces of the pawls 25. When the holding frame 17 having the video disc 15 is inserted completely into the casing 16, the pawls 25 are then fitted in the grooves 26 by the elastic force of the elastic segment 23, thus locking the holding frame 17 to the casing 16. In this condition, the bank 20 seals the opening 19 of the casing 16 completely, preventing dust from entering the casing 16 and contaminating the video disc 15. Even if the bank 20 is grasped to pull out the video disc 15, the holding frame cannot be removed since the holding frame 17 is engageably locked with the casing 16.

Figure 4:
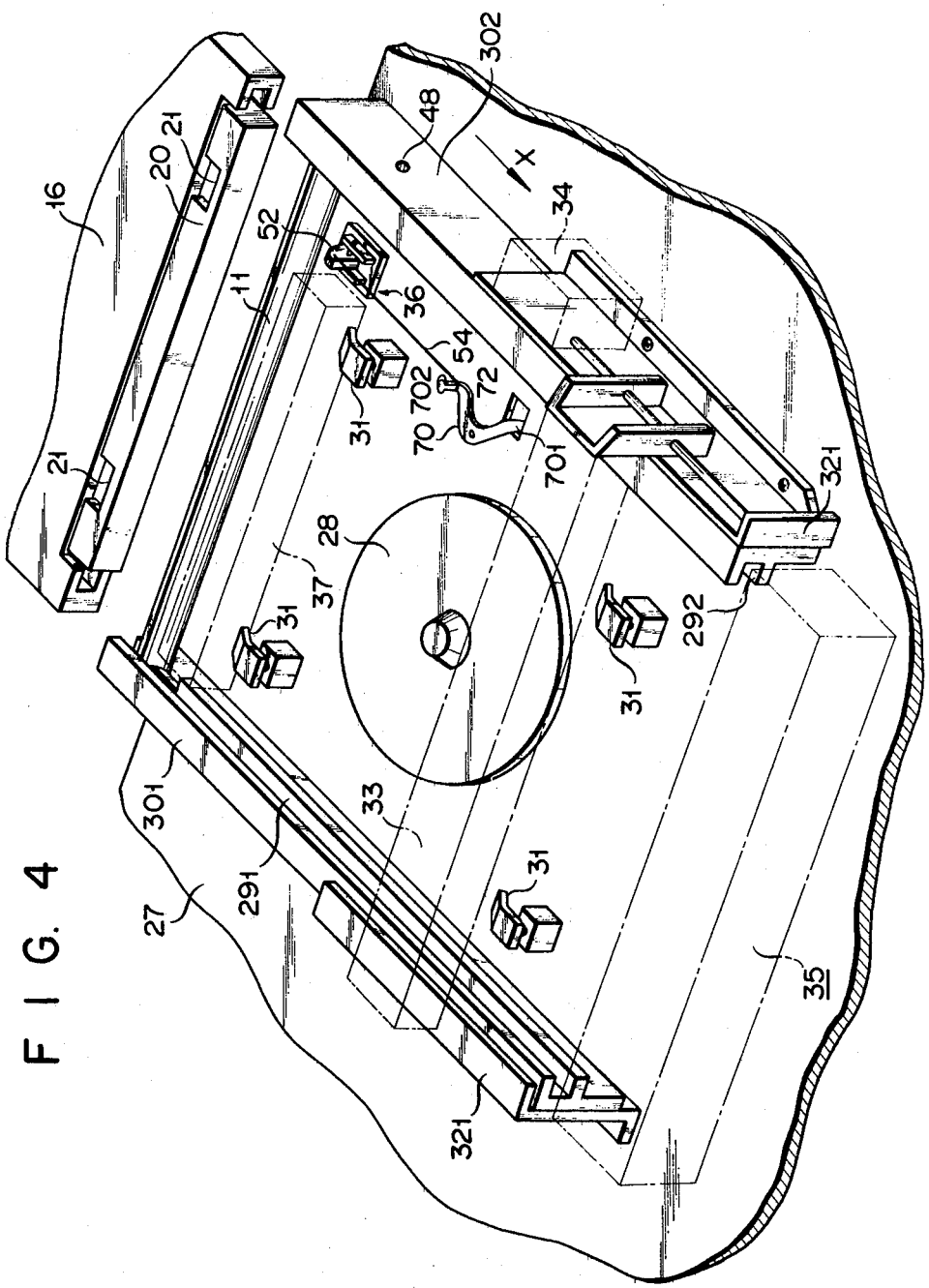
FIG. 4 is a perspective view schematically illustrating an inner arrangement of the apparatus of FIG. 1.

Referring to FIG 4, a guide mechanism of the casing 16 inside the player 10 will be described.

As shown in the figure, a chassis 27 extending horizontally is formed in the housing 12 of the player 10. A turntable 28 which has a diameter smaller than the video disc 15 is mounted on the chassis 27 to be vertically movable driven by a drive mechanism 38 to be described later and to be pivotally driven by another drive mechanism (not shown). The turntable 28 is located below the level of the insertion surface of the casing 16 when the player 10 does not perform the reproduction. In this inoperative condition, when the casing 16 is inserted in the housing 12, and the holding frame 17 and the video disc 15 are mounted at a predetermined position, the operating button 13 is depressed so that reproduction is initiated and the player 10 is rendered operative. The turntable 28 is then moved upward above the level of the insertion surface by the drive mechanism 38. By this upward movement of the turntable 28, the video disc 15 is placed on the turntable 28 so that the video disc 15 is located above the level of the insertion surface. In this condition, the turntable 28 is rotatably driven by another drive mechanism so that the video disc 15 is also rotated.

A pair of guide rails 301 and 302 are mounted parallel to each other on the chassis 27 with the turntable 28 interposed therebetween. The guide rails 301 and 302 extend in the direction of insertion into the housing 12 shown by an arrow X (as opposed to the direction of insertion shown by the arrow R). One end of each of guide rails 301 and 302 is mounted at an end of the insertion inlet 14 shown in FIG. 1. The guide rails 301 and 302 have grooves 291 and 292 which receive both sides of the casing 16 and which are formed at a predetermined height from the upper surface of the chassis 27. The guide rails 301 and 302 have sufficient length to allow complete insertion of the holding frame 17 in the housing 12.

The guide rails 301 and 302 are mounted on the chassis 27 through a pair of auxiliary chassis 321 and 322. A pickup arm 33 extends perpendicularly to the direction shown by the arrow X over the auxiliary chassis 321 and 322. The pickup arm 33 is movable along the direction shown by the arrow X. At one auxiliary chassis 322, a drive mechanism 34 (details not shown) is mounted to drive the pickup arm 33. A reproducing stylus (not shown) is mounted to the pickup arm 33. The reproducing stylus engages with the groove of the video disc 15 placed on the turntable 28 and picks up audio/video signals recorded on the video disc 15.

On the other hand, an auxiliary cover mechanism 37 to be described later adjacent to the cover 11 is disposed inside the housing 12. The auxiliary cover mechanism 37 is provided for preventing insertion of another casing into the housing 12 by detecting the holding frame 17 when it is received inside the housing 12.

Four supporting members 31 are mounted outside the perimeter of the turntable 28 on the chassis 27. These supporting members 31 provide support at the periphery of the through hole 18 formed in the main body 17a of the holding frame 17 and the peripheral edge of the video disc 15 while the video disc 15 is completely stored in the housing 12. The upper surface of the turntable 28 is lower than the level of the supporting members 31 in the inoperative condition. The upper surfaces of the supporting members 31 are substantially the same height as the lower surfaces of the grooves 291 and 292 of the guide rails 301 and 302.

A holding device 35 is attached to that portion of the chassis 27 which faces to the other ends of respective guide rails 301 and 302, in order to hold the bank 20 as needed. The holding device 35 operates to unlock the holding frame 17 from the casing 16 and to hold the holding frame 17 when the casing in which the video disc 15 is held by the holding frame 17 is inserted in the housing 12. The holding device 35 also operates to release the holding frame 17 and to lock the holding frame 17 to the casing 16 when reproduction is completed and the empty casing 16 is inserted in the housing 12 in which the video disc is mounted.

The cover 11 described above will be described in detail with reference to FIGS. 5 to 7.

Figure 5:
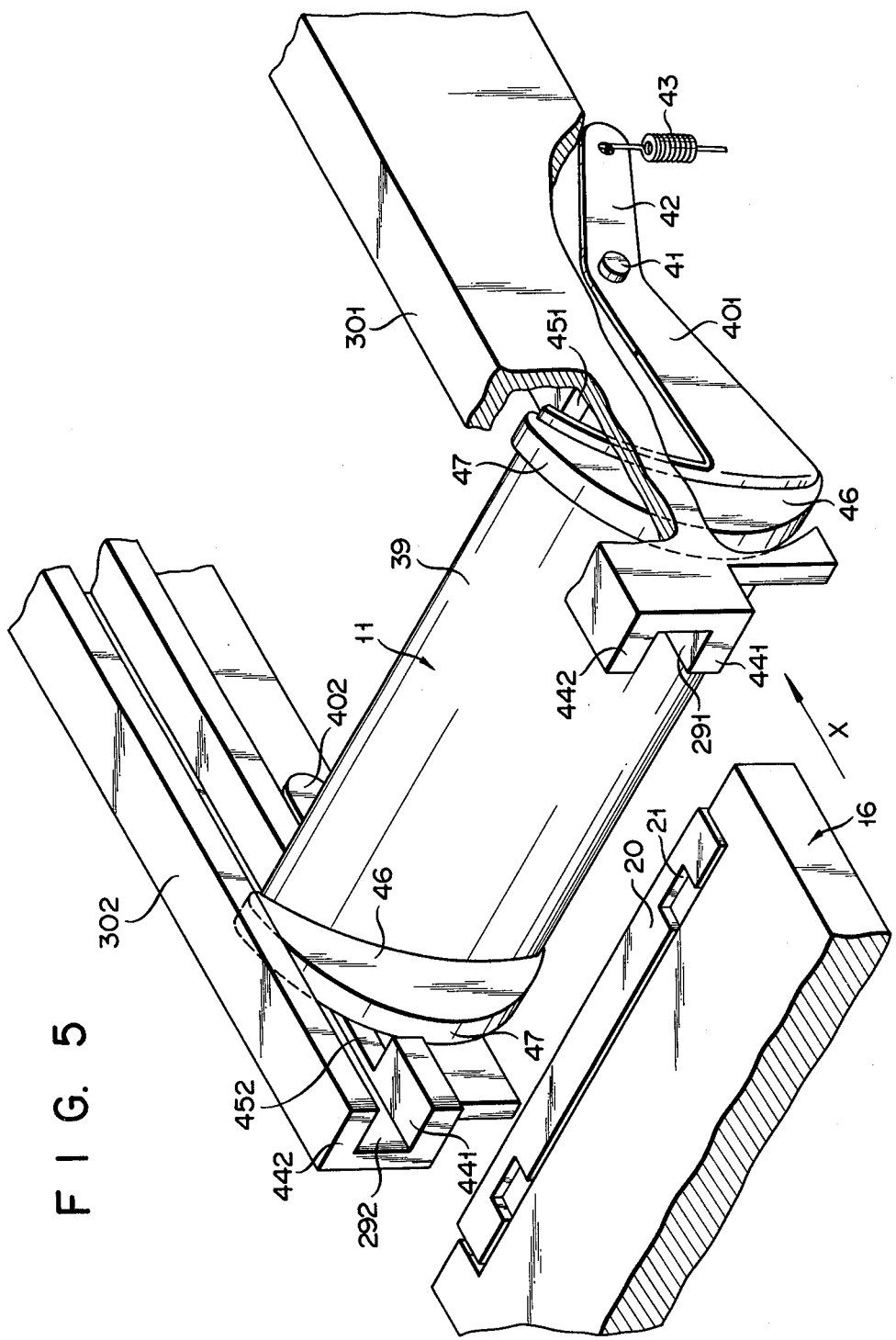
FIG. 5 is a perspective view of a cover taken from the apparatus shown in FIG. 4.

The cover 11 comprises a cover main body 39 which has an arcuated surface around a rotating axis thereof, and is swingable between a close position where it closes the insertion inlet 14 and an open position where it opens the insertion inlet 14, supporting arms 401 and 402 extending from both bottoms of the cover main body 39 along the direction shown by the arrow X to the interior of the housing 12, a pair of pivot pins 41 which are attached at the distal ends of both supporting arms 401 and 402, are extending toward the corresponding guide rails 301 and 302, and have the common rotating axis coaxially described above, an auxiliary arm 42 which is integrally formed with one supporting arm 401 and is extending from one supporting arm 401 downward from the direction shown by the arrow X, and a coil spring 43 stretched between the chassis 27 and the distal end of the auxiliary arm 42 and urging the auxiliary arm 42 (thus, the cover main body 39) clockwise in FIG. 5.

Recesses 451 and 452 to receive both ends of the cover main body 39 are formed at one end of projections 441 which define the bottom surfaces of the grooves 291 and 292 of the pair of guide rails 301 and 302. At the parts which constitute both ends of the cover main body 39 and which are housed in the recesses 451 and 452, cam members 46 are disposed. The cam members 46 have cam surfaces 47 defined by the front surfaces to be described later. Only when an inserted material is pressed against the cam surface 47 along the direction of insertion shown by the arrow X, will the cover main body 39 rotate counterclockwise (FIG. 5) against the urging force of the coil spring 43. The cover 11 is thus opened. However, when the insertion material presses the arcuated surface of the cover main body 38, the cover 11 will not open.

Holes 48 (FIG. 7) for receiving the pivot pins 41 are formed at the predetermined position of the side walls of the pair of guide rails 301 and 302. The pivotal movement of the cover 11 by the urging force of the coil spring 43 is defined when the upper surfaces 47 of the cam members 46 come in contact with projections 442 which define the upper surfaces of the grooves 291 and 292.

Figure 6:
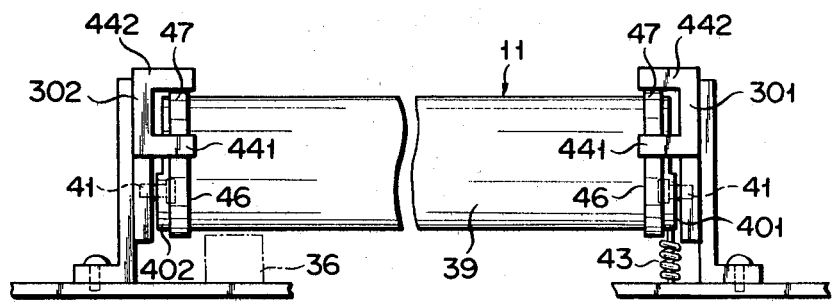
FIG. 6 is a front view of the cover shown in FIG. 5.
Figure 8:
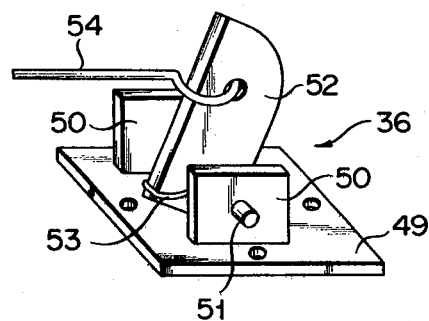
FIG. 8 is a perspective view of a locking mechanism taken from the apparatus shown in FIG. 4.
Figure 9:
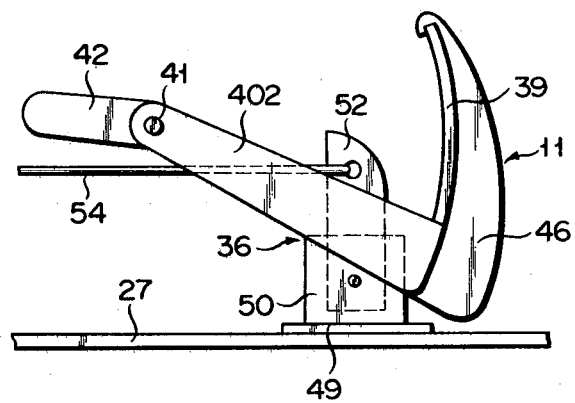
FIG. 9 is a side view of the locking mechanism in its unlocked condition.
Figure 7:
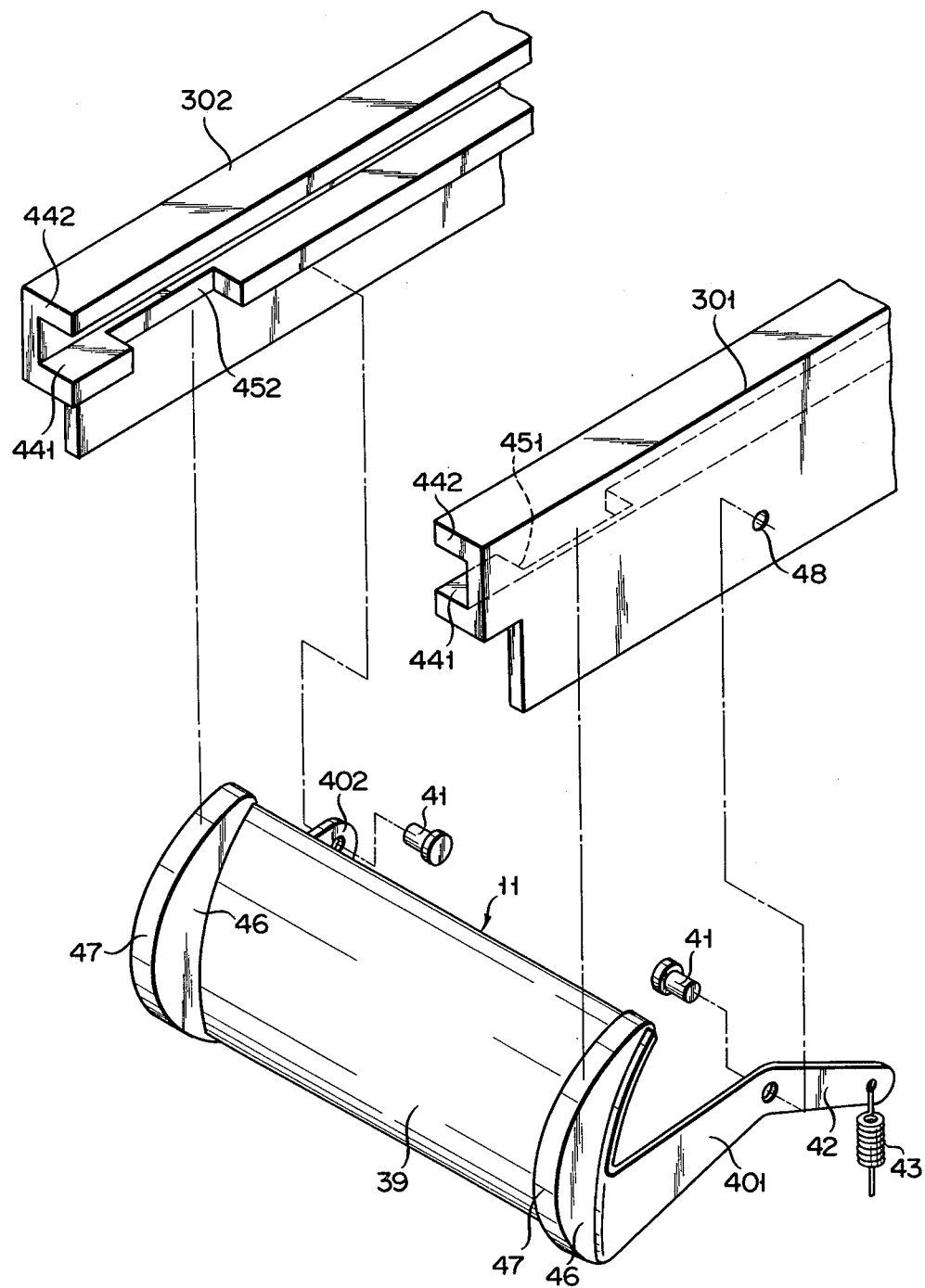
FIG. 7 is an exploded perspective view of the cover shown in FIG. 5.

Referring to FIGS. 4 and 6, the locking mechanism 36 to control the locking condition of the cover 11 is arranged at the part of the chassis 27 below the cover 11. This locking mechanism 36, as shown in FIG. 8, comprises a base plate 49 mounted on the chassis 27, a pair of mounting plates 50 standing on the base plate 49 parallel to each other in the direction of insertion shown by the arrow X, pivot pins 51 fixed between the mounting plates 50 to extend perpendicularly to the direction of insertion shown by the arrow X, locking member 52, the lower end of which is pivotally mounted about the pivot pins 51 regulating the downward pivotal movement of the cover 11 as needed, and a spring 53 to constantly urge the locking member 52 to pivot in the counterclockwise direction in FIG. 8 about the pivot pins 51. One end of a connecting rod 54 is fixed at the upper end of the locking member 52 to define the pivotal position of the locking member 52 in cooperation with the vertical movement of the turntable 28. When the turntable 28 is located below the level of the insertion plane, that is, when the turntable 28 is inoperative, the connecting rod 54 does not act on the locking member 52. Therefore, the locking member 52 is urged by the urging force of the spring 53 to pivot in the counterclockwise direction in FIG. 8, and the locking member 52 is maintained in the unlocked position as shown in FIG. 9. In this unlocked position, the cover 11 pivots freely between the closed position and opening position. On the other hand, when the turntable 28 is moved upward, that is, when the turntable 28 is operating, the connecting rod 54 acts on the locking member 52 so that the locking member 52 pivots in the clockwise direction in FIG. 8. Therefore, the locking member 52 pivots against the urging force of the spring 53 and is maintained in the locked position, in which the upper edge of the locking member 52 is engaged with the lower edge of the cover main body 39 as shown in FIG. 10. In this position, the cover 11 is unable to pivot downward, that is, from the closed position to the opening position.

The drive mechanism 38 regulating the vertical movement of the turntable 28 will be described in detail with reference to FIGS. 11 to 13.

The turntable 28 has a coaxial rotating shaft 55 fixed at its center. The lower end portion of the rotating shaft 55 is located below the chassis 27, extending therethrough. The middle portion of the rotating shaft 55 is rotatably provided in a receiver 56 mounted on the upper surface of the chassis 27 through a bearing 57. This bearing 57 allows movement of the rotating shaft 55 about the axis as well as movement along the axis (i.e., vertical movement). An annular groove 58 is formed at the lower end portion of the rotating shaft 55 and a bottom surface 59 of the rotating shaft 55 is formed by a smooth arcuated surface.

The position of the turntable 28 along the axis is defined by a slider 60. The slider 60 is slidably supported by a pair of slider supports 61 mounted at the lower surface of the chassis 27 along the direction shown by an arrow Y. The slider 60 shown in detail in FIG. 13 has a base plate 62. A recess 63 is formed at substantially the center of the base plate 62. The bottom surface of the recess 63 is constituted by a first flat bottom plate 641 having a predetermined depth from the level of the base plate 62, an inclined bottom plate 642 adjacent to the first flat bottom plate 641 increasing inclination downward in the direction shown by the arrow Y, and a second flat bottom plate 643 adjacent to the inclined bottom plate 642 and having a depth, from the bottom surface of the first flat bottom plate 641, corresponding to the vertical movement of the turntable 28. These plates are arranged in the order named in the direction shown by the arrow Y.

A large opening 65, the cross section of which is larger than that of the rotating shaft 55, is formed at that portion of the first flat bottom plate 641 which is adjacent to the inclined bottom plate 642. A supporting plate 66 which receives the bottom surface 59 of the rotating shaft 55 is mounted at the first flat bottom plate 641 below the opening 65. The supporting plate 66 is disposed parallel to the first flat bottom plate 641 and being spaced apart therefrom. The front end of the supporting plate 66 in the direction shown by the arrow Y is tapered in order to receive the bottom surface of the rotating shaft 55.

A groove 67 is formed along the direction shown by the arrow Y in the inclined plate 642 and a part of the second flat bottom plate 643 to be continuous with the opening 65. The width of the groove 67 is smaller than the diameter of the rotating shaft 55 and larger than the diameter of the annular groove 58. The rotating shaft 55 is supported on the slider 60 through engagement of the periphery of the groove 67 and the periphery of the annular groove 58 of the rotating shaft 55 described above.

One end of a drive lever 68 is connected to the rear portion of the upstream side of the base plate 62 of the slider 60 in the direction shown by the arrow Y. The other end of the drive lever 68 is connected to a drive source (not shown). The drive source drives to move the drive lever 68 in the direction shown by the arrow Y in correspondence with a reproduction instruction which is initiated by depression of the operating button 13. A groove 69 is formed from the recess 63 to the front edge of the base plate 62 of the slider 60, extending along the direction shown by the arrow Y. One end portion 701 of the connecting segment 70 to be described later is inserted in the groove 69. That surface of the front end surface of the recess 63 which is open by the groove 69 is defined as an engaging surface 71 engaged with the one end portion 701 of the connecting segment 70.

As shown in FIG. 4, the connecting segment 70 is pivotally mounted on the upper surface of the chassis 27. The other end 702 of the connecting segment 70 is pivotally connected to the other end of the connecting rod 54. The connecting segment 70 is arranged so as to transmit the movement of the slider 60 to the locking mechanism 36 in the same direction. An opening 72 is formed at the portion of the chassis 27 opposite to the one end portion 701 of the connecting segment 70. The one end portion 701 of the connecting segment 70 is bent to below the chassis 27 through the opening 72 and is inserted in the groove 69 of the slider 60.

The mode of operation of the drive mechanism 38 of the turntable 28 with the above structure will be described. In the inoperative condition shown in FIG. 11, when the operating button 13 is depressed to instruct the reproduction of the video disc 15, the drive lever 68 gradually moves the slider 60 along the direction shown by the arrow Y by the drive source (not shown). In response to the movement of the slider 60, the engagement of the periphery of the annular groove 58 of the rotating shaft 55 with the periphery of the groove 67 of the second flat bottom plate 643 is changed to the engagement of the periphery of the annular groove 58 of the rotating shaft 55 with the periphery of the groove 67 of the inclined plate 642. The rotating shaft 55 of the turntable 28 is lifted along the slope of the inclined plate 642. Therefore, the video disc 15 is mounted on the turntable 28 at the same time as the video disc 15 is released from the support of the supporting member 31, as shown in FIG. 12. When the periphery of the annular groove 58 of the rotating shaft 55 reaches the opening 65 of the first flat bottom plate 643, the engagement is released and the bottom surface 59 of the rotating shaft 55 is supported by the supporting plate 66. In this position, signals recorded on the video disc 15 may be reproduced by the stylus. The turntable 28 is rotated by the other drive mechanism (not shown). The driving force of the other drive mechanism (not shown) is transmitted to the turntable 28 through a belt. Therefore, even if the turntable vertically vibrates, the driving force is firmly transmitted to the turntable 28.

When reproduction is completed, the other drive mechanism stops rotating the turntable 28 and the drive source of the drive mechanism 38 moves the drive lever 68 in the direction opposite to the direction shown by the arrow Y. Therefore, the slider 60 moves in the direction opposite to the direction shown by the arrow Y. The rotating shaft 55 is released from the position in which the bottom surface 59 of the rotating shaft 55 is engaged with the supporting plate 66 of the slider 60 and is then located at the position in which the periphery of the annular groove 58 of the rotating shaft 55 is engaged with the periphery of the groove 67 formed at the inclined plate 642 of the slider 60. The rotating shaft 55 descends corresponding to the movement of the slider 60. Therefore, the turntable 28 changes from the position where it is mounted on the turntable 28 to the position where it is placed on the supporting member 31, as shown in FIG. 11. The periphery of the annular groove 58 of the rotating shaft 55 is engaged with the periphery of the groove 67 formed at the second flat bottom plate 643 so that the turntable 28 stops descending and the drive source stops driving the drive lever 68, thus establishing nonreproducing mode.

In this way, the turntable 28 is vertically moved. When the turntable 28 is located in the upward position, the video disc 15 is mounted thereon, indicating the operating mode. When the turntable 28, however, is located in the downward position, the video disc 15 is not mounted thereon, indicating the nonreproducing mode. In other words, the reproducing mode and the nonreproducing mode are determined in accordance with the position of the turntable 28, and therefore the position of the slider 60.

The one end portion 701 of the connecting segment 70 is located within the range of movement of the slider 60. In the nonreproducing mode, the one end portion 701 of the connecting segment 70 comes in contact with the side edge of the upstream side of the opening 72 along the direction shown by the arrow Y, urged by the urging force of the spring 53 of the locking mechanism 36. In this condition, the cover 11 is free to open or close. As the player 10 is brought to the reproducing mode, the slider 60 is moved toward the direction shown by the arrow Y. The engaging surface 71 of the slider 60 is engaged with the one end portion 701 of the connecting segment 70 and presses it. Therefore, the connecting segment 70 is moved in the direction shown by the arrow Y against the urging force of the spring 53.

When the slider 60 is in the reproducing position as shown in FIG. 12, the connecting segment 70 is moved at maximum so that the locking member 52 connected to the connecting segment 70 through the connecting rod 54 is pivoted clockwise in FIG. 10, thus establishing the locked condition. Therefore, the lower end of the cover main body 39 is engaged with the front end of the locking member 52, thus preventing the opening of the cover 11. The cover 11 is thus locked in the reproducing mode.

The locking mechanism 36 is so constructed that it regulates the opening operation of the cover 11. When reproduction is not performed, the locking mechanism 36 is in the unlocked position, and the cover 11 is free to open or close. However, when reproduction is performed, the locking mechanism 36 is in the locked position and the cover 11 is locked and will not open. Therefore, in the reproducing mode, another casing or other materials such as pencils cannot be introduced, thus protecting the internal mechanisms of the housing 12 and the video disc 15.

The pair of cam members 46 mounted to the cover main body 39 will be described with reference to FIGS. 14 to 18.

The cam surface 47 of the cam member 46 is constituted by a profile curve which satisfies the relation $\theta < 90° - \phi$ wherein $\theta$ is the pressure angle to be described later, and $\phi$ is the angle defined as the angle of friction between the cam surface 47 and the casing 16 at the contact point P (shown in FIG. 14). The surface of the cover main body 39 is defined as part of the arcuated surface about the rotating axis of the pivot pins 41. The cam surface 47 of the cam member 46 is inclined more than the surface of the cover main body 39. Therefore, only when the cam surfaces 47 are horizontally pressed, the cover 11 is pivoted counterclockwise in FIG. 15, against the urging force of the spring 43 to open to cover 11. Even if the force is horizontally acted on the surface of the cover main body 39, the force does not act to open the cover 11 and the cover 11 will not open.

Figure 16:
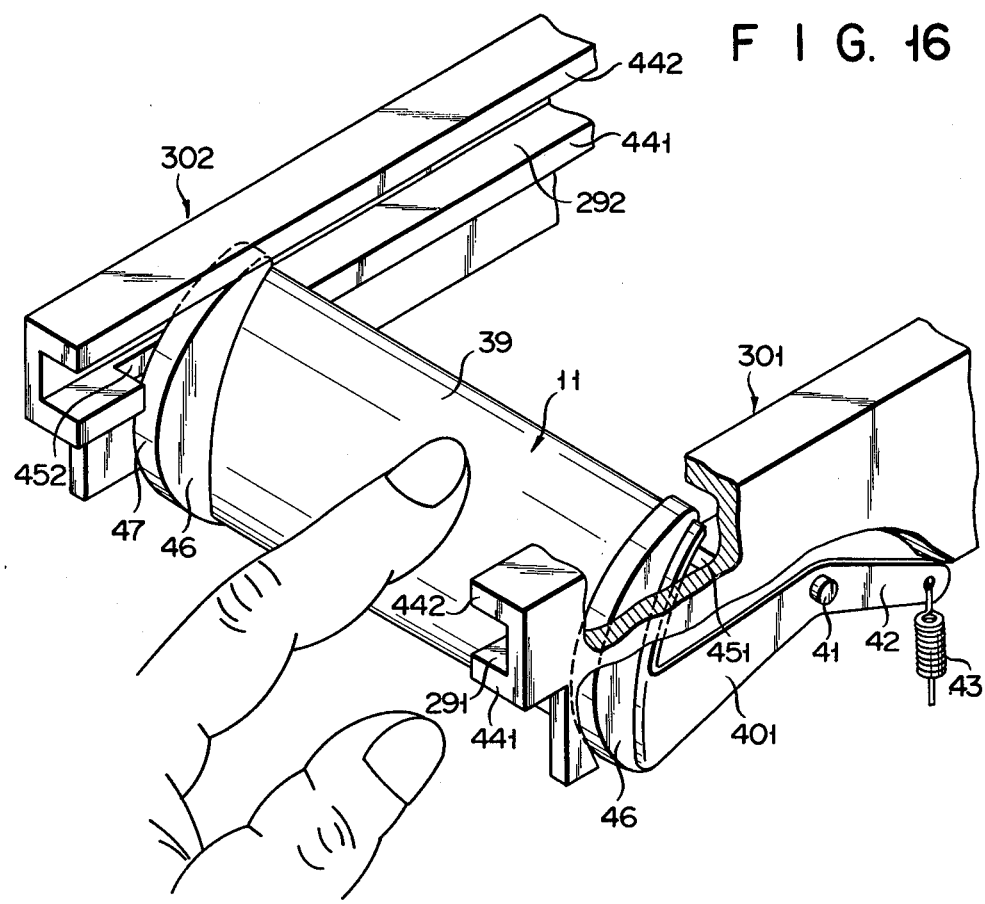
FIGS. 16 and 17 are a perspective view and a side view, respectively, when the cover is closed.
Figure 17:
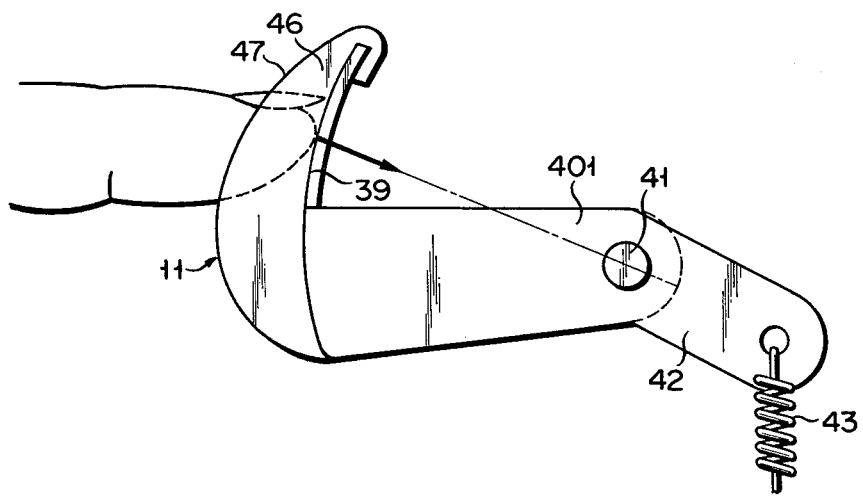
Figure 18:
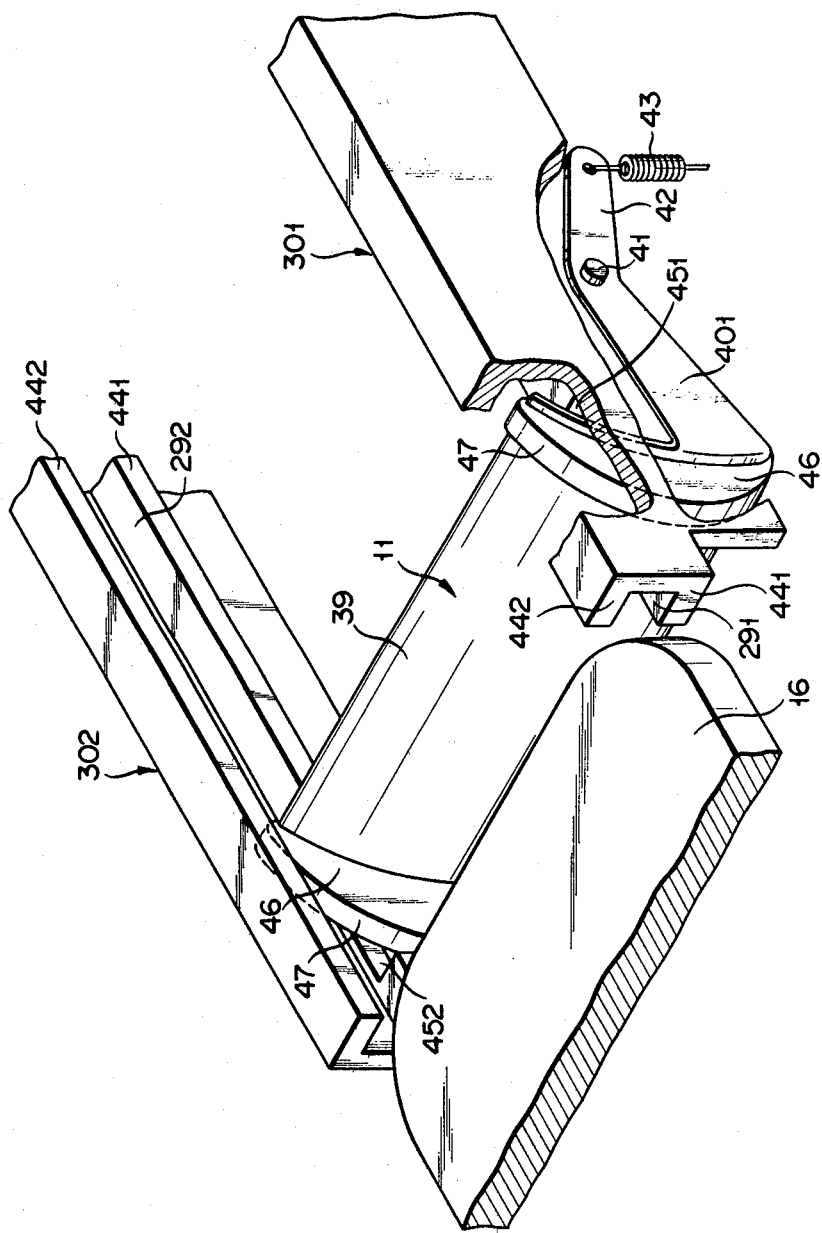
FIG. 18 is a perspective view of the cover, the position of which is different from that shown in FIG. 16.

Both cam members 46 are located within the recesses 451 and 452 formed at the lower projections 441 of the pair of guide rails 301 and 302. Therefore, the cover 11 will not open even if the cover 11 is pressed by fingers. The fingers do not touch the cam members 46 and only touch the surface of the cover main body 39 as shown in FIGS. 16 and 17. Since the insertion force by fingers is constantly directed from the surface of the cover main body 39 to the pivot pins 41 as shown in FIG. 17, the cover 11 cannot be opened by the fingers because the insertion force does not act as the force which rotates the cover 11 counterclockwise. Even when the casing 16 is erratically inserted from the rear as shown in FIG. 18, both rear ends of the casing 16 do not come in contact with the cam surfaces 47 of the cam members 46 since the both ends of the rear of the casing 16 are rounded. The rear ends of the casing are only in contact with the surface of the cover main body 39. Therefore, even if the casing is inserted from its rear side into the housing 12, the cover 11 will not open.

The conditional relation of the cam surface 47 is obtained based on the theoretical principle proposed by the inventor below.

As the casing 16 is inserted, it applies force F on the cover 11 at point P where it contacts the cam surface 47. As shown in FIG. 14, the force F is composed of a component FB ($=F \cdot \sin \theta$) and a component FA ($=F \cdot \cos \theta$). The component FB acts in a direction perpendicular to line connecting the pivot pin 41 and the point P. And the component FA acts to rotate the cover 11 counterclockwise. At the point P a frictional force $F \cdot \mu$ acts in a direction at right angles to the direction in which the force F acts. The force $F \cdot \mu$ therefore works to prevent the cover 11 from rotating.

Where $\mu$ is the coefficient of friction. The $F \cdot \mu$ is divided into two directions described before.

The necessary condition for acting the cover 11 in the counterclockwise direction is given from the figure by the following relation:

$$FA > F \cdot \mu \cdot \sin \theta, \text{ that is } F \cdot \cos \theta > F \cdot \mu \cdot \sin \theta$$

Therefore, the condition $\tan \theta < 1/\mu$ ... (I) is obtained.

The coefficient of friction $\mu$ is calculated with respect to the angle of friction $\phi$. The angle of friction $\phi$ is the angle at which an object starts slipping down a slope by its own weight. This angle is determined by the coefficient of friction $\mu$ of the contact surface between the object and the slope. The condition for starting to slip down the object is given by the following relation:

$$F \cdot \geq N \cdot \mu \quad \text{(II)}$$

where N is the reaction force acted on the object $$N = W \cdot \cos \phi \quad \text{(III)}$$

(W: weight of the object).

F is defined as the force which slips the object along the slope and is given as follows:

$$F = W \cdot \sin \phi \quad \text{(IV)}$$

Therefore, relations (III) and (IV) are substituted into relation (II), so that the following relation is obtained.

$$W \cdot \sin \phi \geq \mu \cdot W \cdot \cos \phi$$

Therefore, $\mu \leq \tan \phi$... (V) is obtained. According to relations (I) and (V), the following relation is obtained.

$$\tan \theta < 1/\tan \phi$$

If $\phi$ is substituted by $90° - \beta$, $$\tan \theta < 1/\tan (90° - \beta),$$

$$\tan \theta < \cos (90° - \beta)/\sin (90° - \beta)$$

and then $$\tan \theta < \sin \beta/\cos \beta,$$

therefore, $\tan \theta < \tan \beta$.

In this way, the condition $\theta < \beta$, that is, the aforementioned condition $\theta < 90° - \phi$ is obtained.

The pressure angle $\theta$ is determined within the range satisfying the above condition and the cam surface 47 is defined by the profile curve based on the pressure angle. Therefore, only when the cam surfaces 47 are pressed, the cover 11 pivots counterclockwise so that the cover 11 is free to open.

Since the pair of cam members 46 are formed at both ends of the cover main body 39 inside the recesses 451 and 452 formed at the lower projections 441 of the pair of guide rails 301 and 302, the cover 11 cannot be opened by pushing the surface of cover main body 39 through fingers or similar implements such as pencils, whether or not the player 10 is in the reproducing mode. Further, even if an attempt is made to insert the casing 16 from its rear side, the rear side does not come in contact with the cam members 46 so that the cover 11 will not open. Thus the internal mechanisms of the apparatus and the video disc inserted in the housing 12 is protected.

The auxiliary cover mechanism 37 will be described with reference to FIGS. 19 to 25.

As shown in FIG. 19, the auxiliary cover mechanism 37 comprises an auxiliary cover main body 73 inside the housing 12 adjacent to the cover main body 39 along the direction shown by the arrow X. The auxiliary cover main body 73 is pivotally mounted to the pair of guide rails 301 and 302. The auxiliary cover main body 73 includes a main frame 74 disposed parallel to the cover main body 39. A locking plate 75 is fixed at the front surface of the main frame 74, extending toward the cover main body 39 by a predetermined length and further standing upward. The locking plate 75 has a length shorter than the main frame 74. When the casing 16 is inserted, the locking plate 75 only comes in contact with the bank 20 of the holding frame 17. A pair of cam members 76 are attached upright to both ends of the main frame 74, extending in the direction shown by the arrow X. Each cam member 76 has a cam surface constituted by the front end surface which inclines backward. The front end of the cam surface is set backward from the front end surface of the locking plate 75. A pair of sub-frames 771 and 772 are fixed to the main frame 74 located inside that portion of the main frame 74 in which the cam members 76 are provided, extending backward along the direction shown by the arrow X. A rotating shaft 78 is attached to the distal ends of the sub-frames 771 and 772, parallel to the cover main body 39 and extending through the sub-frame 771 and 772. The rotating shaft 78 is pivotally mounted to the pair of guide frames 301 and 302.

An engaging arm 79 is attached to the distal end of the one sub-frame 771 which is located at the side of the first guide rail 301, extending downward obliquely therefrom. A coil spring 80 is stretched between the chassis 27 and the lower end of the engaging arm 79. The coil spring 80 urges the auxiliary cover main body 73 clockwise in the figure. When any external force is not acted on the engaging arm 79, the auxiliary cover main body 73 is maintained at the position in which the casing 16 is prevented from entering the housing 12 as shown in FIG. 21 by the urging force of the coil spring 80.

A regulating member 81 for regulating the pivotal movement of the auxiliary cover main body 73 is mounted to move along the direction shown by the arrow X on the chassis 27 and to oppose the lower end of the engaging arm 79. The regulating member 81 comprises a flat first cam surface 821 which has a predetermined height and may be in contact with the lower end of the engaging arm 79 and an inclined second cam surface 822 adjacent to the first cam surface 821 in the direction shown by the arrow X. The second cam surface 822 inclines so as to reduce its height gradually toward the rear side. The height of the first cam surface 821 is determined so that auxiliary cover main body 73 rotates counterclockwise to prevent the locking plate 75 from entering into the casing 16 when the engaging arm 79 comes in contact with the first cam surface 821.

A detecting mechanism 83 is disposed opposite to the rear end of the first guide frame 301 in order to detect the presence or absence of the holding frame 17 inside the housing 12. The detecting mechanism 83 comprises a mounting plate 84 mounted on the chassis 27 and extending in the direction shown by the arrow X, a detecting lever 85 pivotally mounted to the mounting plate 84 within the vertical plane including the direction shown by the arrow X, and a coil spring 86 stretched between the detecting lever 85 and the mounting plate 84 urging the detecting lever 85 counterclockwise. The one end of the detecting lever 85 is engageable with the holding frame 17. When the holding frame 17 is completely stored in the housing 12, the end of the detecting lever 85 is engaged with the holding frame 17 and pivoted clockwise against the urging force of the coil spring 86. When the detecting lever 85 is located at the position shown in FIG. 20, the detecting mechanism 83 detects that the holding frame 17 is not completely stored in the housing. When the detecting lever 85 is in the position shown in FIG. 21, the detecting mechanism 83 detects that the holding frame 17 is completely stored in the housing.

The other end of the detecting lever 85 is connected to the regulating member 81 through a connecting rod 87. The length of the connecting rod 87 is determined so as to engage the first cam surface 821 of the regulating member 81 with the lower end surface of the engaging arm 79 when the detecting lever 85 is in the nondetecting position shown in FIG. 20, and also determined so as not to bring the engaging arm 79 into contact with the regulating member 81 when the detecting lever 85 is in the detecting position shown in FIG. 21. When the detecting lever 85 pivots clockwise from the position shown in FIG. 20 to the position shown in FIG. 21, the regulating member 81 is moved to the direction opposite to the direction shown by the arrow X.

A recess 88 is formed at one side of the housing in which opening 19 is formed to receive the bank 20 of the holding frame 17 of the casing 16, as shown in FIG. 2. In other words, both ends 89 of one side of the casing 16 extend toward the front.

The mode of operation of the auxiliary cover mechanism 37 with the above structure will be described.

The casing 16 storing the video disc 15 with the holding frame 17 is partially inserted into the housing 12 by pressing down the cover 11 which is not locked by the locking mechanism 36. In this case, the detecting mechanism 83 does not detect the insertion of the casing 16 since the holding frame 17 is not engaged with the detecting lever 85 of the detecting mechanism 83. The auxiliary cover main body 73 is at a position which does not prevent insertion of the casing 16 since the lower end surface of the engaging arm 79 is engaged with the first cam surface 821 as shown in FIG. 20. Therefore, the casing 16 is further inserted in the housing 12, the holding frame 17 makes the detecting mechanism 83 operate, and the holding frame 17 is held by the holding device 35. Although the auxiliary cover main body 73 tends to pivot clockwise by the urging force of the coil spring 80 when the lower end surface of the engaging arm 79 is disengaged with the first cam surface 821 of the regulating member 81 in response to the detecting operation, contact between the lower surface of the casing 16 and the upper end of the locking plate 75 forces the auxiliary cover main body 73 to maintain its open position. Thus, the casing 16 is only removed from the housing 12 while the holding frame 17 and the video disc 15 remain inside the housing 12. In this conditon, the locking plate 75 does not have any object to be locked, so that it moves to the position to prevent another insertion of a casing by the urging force of the coil spring 80 as shown in FIG. 21.

Figure 22:
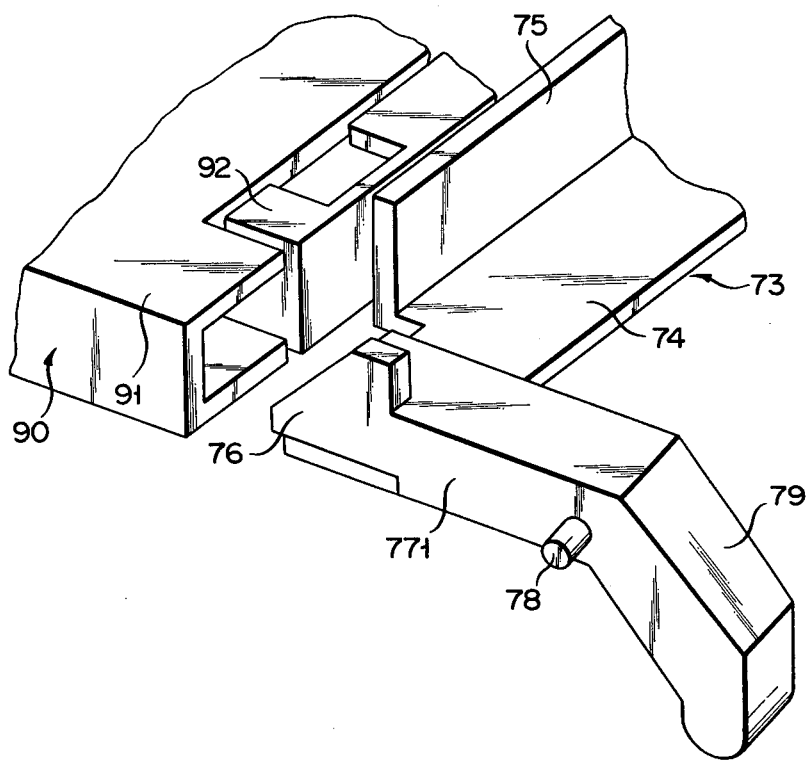
FIGS. 22 and 23 are a perspective view and a side view of the auxiliary cover mechanism, respectively, the position of which prevents insertion of another casing.
Figure 23:
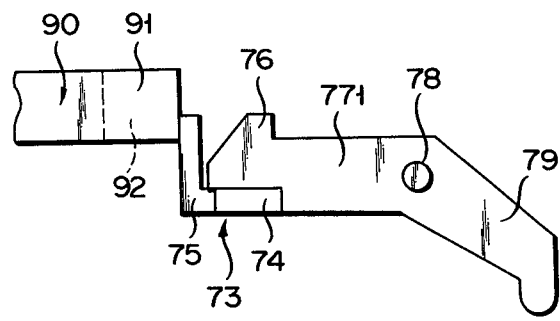

In the condition shown in FIG. 21, the reproduction operation is instructed. Before the reproduction is initiated or after the reproduction is completed, assume that another casing 90 having another video disc 15 inside is erratically inserted in the housing 12. Since the player 10 is not operating, another casing 90 can be partially inserted in the housing 12 since the cover 11 is not locked by the lockng mechanism 36. When the front of the other casing 90 reaches the auxiliary cover mechanism 37, a bank 92 of another holding frame of another casing 90 engages with the locking plate 75 of the auxiliary cover mechanism 37 before both front ends 91 of another casing 90 engage with the pair of cam members 76 as shown in FIGS. 22 and 23, since another holding frame is stored in another casing 90. The further insertion of another casing 90 is thus prevented. Therefore, when another casing 90 having another video disc 15 is inserted in the nonreproducing mode while the video disc 15 is already stored in the housing 12, the auxiliary cover mechanism 37 prevents complete insertion of another casing 90 inside the housing 12, thus protecting the internal mechanisms of the housing and the video disc 15 inside the housing 12 as well as the video disc of another casing 90. This protecting operation is performed in the nonreproducing mode after reproduction is completed and in the nonreproducing mode before reproduction is initiated. Even when the operator forgets that the video disc 15 is already inserted in the housing 12, another video disc cannot be further inserted.

Figure 24:
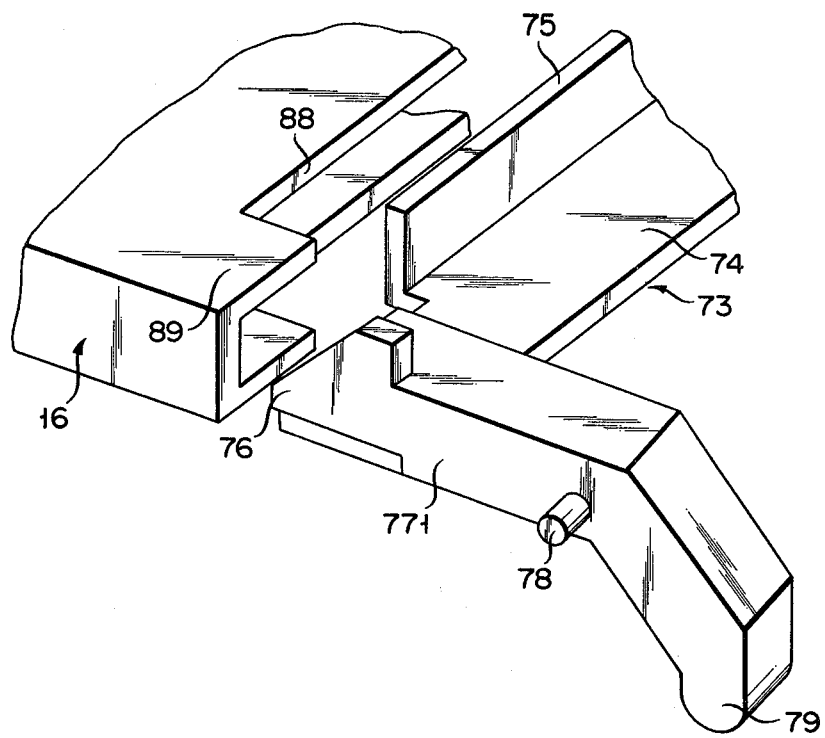
FIGS. 24 and 25 are a perspective view and a side view of the auxilirary cover mechanism, respectively, the position of which allows insertion of the empty casing.
Figure 25:
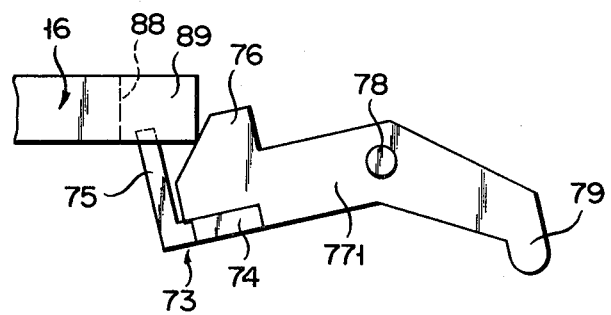

When the empty casing 16 is inserted in the housing 12 in the nonreproducing mode, the cover 11, which is not locked by the locking mechanism 36, is free to open when the empty casing 16 is inserted. The front end of the casing 16 thus reaches the auxiliary cover mechanism 37. In this position, both ends 89 of the casing 16 engage with the pair of the cam members 76 of the auxiliary cover mechanism 37 as shown in FIGS. 24 and 25 before the deepest section of the recess 88 of the empty casing 16 becomes in contact with the locking plate 75 of the auxiliary cover mechanism 37. Therefore, when the empty casing 16 is further inserted, the inclined surfaces of the cam members 76 are pressed downward and the auxiliary cover main body 73 pivots counterclockwise against the urging force of the coil spring 80. Thus, the empty casing 16 is smoothly inserted in the housing 12 without being blocked by the auxiliary cover mechanism 37. The video disc 15 and the holding frame 17 are stored in the casing 16. This storing operation is accomplished when the holding device 35 releases the holding frame 17 and the holding frame 17 is locked in the casing 16. Therefore, when the casing 16 is removed from the housing 12, the video disc 15 with the holding frame 17 is also removed from the housing 12.

The present invention is not limited to one embodiment described above. Various modifications may be provided within the sprit and scope of the present invention.

In the drive mechanism 38 of the turntable 28 in one embodiment, the driving force from the drive source (not shown) is transmitted to the slider 60 through the drive lever 68 in order to move the slider 60. However, the drive lever 68, for example, may be manually operated. If the drive source is a motor, the rotational movement may be converted to a linear movement. This linear movement may be transmitted through a slipping mechanism which absorbs excessive movement. Alternatively, the linear movement may be transmitted within the predetermined driving time by a clutch mechanism.

Further, the locking mechanism 36 is not limited to the arrangement described herein. The mechanism 36 may be modified as in examples to be described below. The same reference numerals in the modifications denote the same parts as in one embodiment described herein and the detailed description is thus omitted.

FIGS. 26 and 27 show one modification of one embodiment of the locking mechanism 36 described before. In this modification, the locking member 52 and the pivot pin 51 are integrally formed. Open recesses 93 are formed on the upper surfaces of a pair of mounting plates 50 and the bottom surface of each recess is rounded to receive the pivot pin 51.

In this manner, the pivot pin 51 is pivotally supported in the recesses 93. The spring 53 provides a predermined rotational force to the locking member 52 and presses the pivot pin 51 to the bottom of the recess 93. According to this modification, the same effect as in the embodiment is obtained except that the assembly and disassembly of the locking mechanism 36 are simplified.

Figure 29:
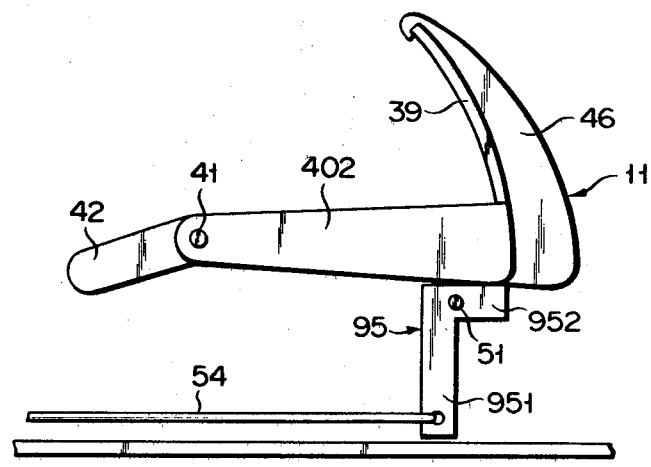
FIG. 29 is a side view of the locking mechanism shown in FIG. 28 in its locked condition.
Figure 30:
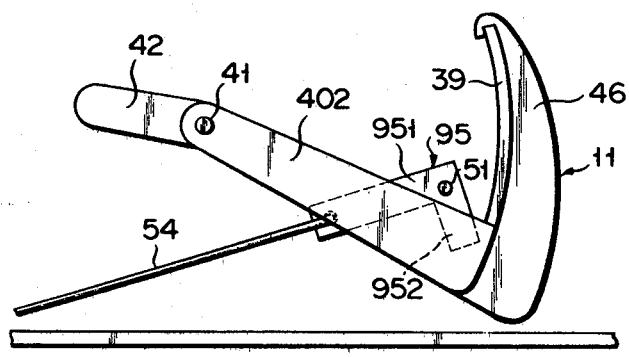
FIG. 30 is a side view of the locking mechanism shown in FIG. 28 in its unlocked condition.

FIGS. 28 to 30 show another modification of one embodiment of the locking mechanism 36.

In this modification, two rod-shaped arms 951 and 952 perpendicular to each other constitute a locking member 95 in place of the locking member 52. The locking member 95 has an L-shaped cross section and is formed of rigid material. The locking member 95 is rotatably supported at the pivot pin 51 of the bent section. At the lower end of one arm 951 of the locking member 95, the connecting rod 54 which is made of rigid material is connected. The other arm 952 of the locking member 95 extends from the pivotal point to the cover 11 and the distal end of the locking member 95 is defined as a locking section. One arm 951 of the locking member 95 stands upright, while the other arm 952 thereof extends horizontally in the locked condition as shown in FIG. 29. However, in the position as shown in FIG. 30, at which the locking member 95 is rotated about 75° clockwise from the position shown in FIG. 29, the locking condition is released. This rotation depends on the movement of the slider 60, the driving force of which is transmitted through the connecting rod 54 described herein.

Substantially, the same effect as in the embodiment is obtained in this modification.

The disc is not limited to the video disc, but extends to an audio disc recorded with the PCM system.

What is claimed is:

1. An apparatus for reproducing signals from a disc, in which said disc stored in a casing is inserted and which comprises:
   a housing having on one side an inlet through which said casing is inserted;
   a cover movable between a first position where it closes the inlet of said housing and a second position where it opens the inlet;
   a locking mechanism for preventing said cover from moving to the second position when signals are reproduced from said disc and for moving said cover to the second position when signals are not reproduced from said disc;

a turntable which is disposed within said housing and on which said disc is mounted, said turntable being arranged so as to be vertically movable between a third position, the level of which is lower than that of said inlet and a fourth position, the level of which is higher than that of said inlet;

a moving mechanism for maintaining said turntable at either the third or fourth position in the nonreproducing mode or in the reproducing mode, wherein said locking mechanism includes a locking member, engageable with said cover, which locking member is located at a fifth position not to engage with said cover in response to the movement of said turntable to the third position whereby said cover is movable to the second position, and which is located at a sixth position to engage with said cover in response to the movement of said cover to the fourth position whereby said cover is prevented from moving to the second position, and a slider having an inclined surface engaged with said turntable, said slider being reciprocally movable, and wherein said turntable vertically moves in response to the reciprocal movement of said slider;

said locking mechanism having connecting means for connecting said locking member and said slider;

said slider lifting said turntable from the third position to the fourth position in one way movement and descends said turntable from the fourth position to the third position in the movement opposite to the one way movement, whereby said locking member is moved to the sixth position so as to engage with daid cover in response to the one way movement of said slider through said connecting means and is moved to the fifth position so as not to engage with said cover in response to the movement opposite to the one way movement of said slider through said connecting means.

2. The apparatus according to claim 1 wherein said locking mechanism includes a first urging means for urging said locking member to the fifth position where said locking member does not engage with said cover.

3. The apparatus according to claim 2, wherein said locking member is pivotally supported.

4. The apparatus according to claim 1, 2 or 3, wherein said cover is pivotally supported between the first position and the second position, which further comprises a second urging means for urging said cover to the first position.

5. The apparatus according to claim 4, wherein said cover is pivoted to the second position against the urging force of said urging means in response to insertion of said casing.

6. The apparatus according to claim 5, wherein said cover includes a cover main body; and cam means mounted at the front surface of said cover main body and having a cam surface for engaging with said casing inserted in said housing and for defining an insertion force in the direction in which said cover main body is pivoted to the second position.

7. The apparatus according to claim 6, wherein said cam means has a pair of cam members, each of which has said cam surface.

8. The apparatus according to claim 7 which further comprises:

a pair of guide rails formed within said housing and supporting both sides of said casing to define the insertion direction of said casing into said housing, one end of each guide rail opposing both ends of said inlet of the housing, and said guide rails respectively having recesses for receiving said cam members.

9. The apparatus according to claim 8, wherein the front surface of said cover main body is of the arcuated shape about the pivotal point thereof, a cam surface of each cam member having a curvature defined by the following relation:

$$\theta < 90° - \phi$$

where $\theta$: pressure angle at the point where the casing comes in contact with the cam surface, and $\phi$: angle of friction between the casing and the cam member.

10. The apparatus according to claim 1, 2 or 3 further comprising:

detecting means for detecting the presence of said disc in said housing, and an auxiliary cover mechanism, adjacent to said cover and arranged within said housing, for preventing insertion of another casing having another disc when the presence of said disc is detected by said detecting means and for allowing insertion of the empty casing in said housing.

11. The apparatus according to claim 10, wherein said auxiliary cover mechanism includes an auxiliary cover main body which is pivotally supported, which is located at a seventh position not to close said inlet when said detecting means does not detect the present of said disc, and which is pivoted to a eighth position to close said opening when said detecting means detects the presence of said disc, and said casing includes a holding frame which has an opening and a front end surface said disc is arranged in the opening, and which is detachably stored in said casing with said disc, a front end surface of said holding frame extending outward, said auxiliary cover main body having a locking plate which is in contact with the front end surface of said holding frame of another casing when located at the eighth position for closing said inlet and is not in contact with the front end surface of the empty casing when the empty casing is inserted in said housing, and at least one cam member which is not in contact with the front end surface of said holding frame in another casing but with the front end surface of the empty casing.

12. The apparatus according to claim 11, wherein said cam member has an inclined cam surface, said auxiliary cover mechanism has urging means for urging said auxiliary cover main body to the eighth position to close said inlet, and when the empty casing is inserted into said housing, said auxiliary cover main body is pivoted to the seventh position where said inlet is not closed against the urging force of said urging means by the engagement the front end surface of said empty casing with said cam surface.

13. An apparatus for reproducing signals from a disc, stored in a casing and inserted therein, comprising:

a housing having at one side an inlet through which said casing is inserted;

a cover movable between a first position where it closes the inlet of said housing and a second position where it opens the inlet;

a turntable, disposed within said housing and on which said disc is mounted, arranged so as to be vertically movable between a third position, the level of which is lower than that of said inlet and a fourth position, the level of which is higher than that of said inlet;

a moving mechanism for moving said turntable to the third position or to the fourth position;

a locking mechanism linked to the movement of the turntable between the third and fourth positions, for preventing said cover from moving to the second position when said turntable is in the fourth position and for permitting said cover to move from the first position to the second position when said turntable is in the third position;

a cover main body; and cam means, mounted at the front surface of said cover main body and having a pair of cam surfaces, for engaging with said casing inserted in said housing and for defining the insertion force in the direction in which said cover is pivoted to the second position.

14. An apparatus according to claim 13, wherein said cover is pivotally supported between the first position and the second position, said apparatus further comprising urging means for urging said cover to the first position.

15. An apparatus according to claim 14, wherein said cover is pivoted to the second position against the urging force of said urging means in response to insertion of said casing.

16. An apparatus according to claim 13, further comprising a pair of guide rails formed within said housing and supporting both sides of said casing and said guide rails respectively having recesses for receiving said cam members.

17. An apparatus according to claim 16, wherein the front surface of said cover main body is of an arcuate-shape about the pivotal point thereof, a cam surface of each cam member having a curvature defined by the following relation:

$$\theta < 90° - \phi$$

where $\theta$: pressure angle at the point where the casing comes in contact with the cam surface; and $\phi$: angle of friction between the casing and the cam member.

18. An apparatus for reproducing signals from a disc, stored in a casing and inserted therein, comprising:

a housing having at one side an inlet through which said casing is inserted;

a cover movable between a first position where it closes the inlet of said housing and a second position where it opens the inlet;

a turntable, disposed within said housing and on which said disc is mounted, arranged so as to be vertically movable between a third position, the level of which is lower than that of said inlet and a fourth position, the level of which is higher than that of said inlet;

a moving mechanism for moving said turntable to the third position or to the fourth position;

a locking mechanism linked to the movement of the turntable between the third and fourth positions for preventing said cover from moving to the second position when said turntable is in the fourth position and for permitting said cover to move from the first position to the second position when said turntable is in the third position;

detecting means for detecting the presence of said disc in said housing; and an auxiliary cover mechanism, adjacent to said cover and arranged within said housing, for preventing insertion of another causing having another disc when the presence of said disc is detected by said detecting means and for allowing insertion of the empty casing into said housing.

19. An apparatus according to claim 18, wherein said auxiliary cover mechanism includes an auxiliary cover main body which is pivotally supported, which is located at a seventh position to open said inlet when said detecting means does not detect the presence of said disc, and which is pivoted to an eighth position to close said opening when said detecting means detects the presence of said disc;

said casing includes a holding frame which has an opening and a front end surface, said disc being arranged in the opening, and which is detachably stored in said casing with said disc, a front end surface of said holding frame extending outward; and said auxiliary cover main body has a locking plate which is in contact with the front end surface of said holding frame of another casing when located at the eighth position for closing said inlet and is not in contact with the front end surface of the empty casing when the empty casing is inserted in said housing, and at least one cam member which is not in contact with the front end surface of said holding frame in another casing but with the front end surface of the empty casing.

20. An apparatus according to claim 19, wherein said cam member has an inclined cam surface, said auxiliary cover mechanism has urging means for urging said auxiliary cover main body to the eighth position to close said inlet; and when the empty casing is inserted into said housing, said auxiliary cover main body is pivoted to the seventh position where said inlet is not closed against the urging force of said urging means by the engagement of the front end surface of said empty casing with said cam surface.

* * * * *